US009965535B2

(12) United States Patent
Tran et al.

(10) Patent No.: US 9,965,535 B2
(45) Date of Patent: May 8, 2018

(54) CLIENT-SIDE HANDLING OF TRANSIENT DUPLICATES FOR ROW-LEVEL REPLICATION

(71) Applicant: Oracle International Corporation, Redwood Shores, CA (US)

(72) Inventors: Hung V. Tran, Sunnyvale, CA (US); Lik Wong, Union City, CA (US); Edwina Ming-Yue Lu, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 708 days.

(21) Appl. No.: 13/622,276

(22) Filed: Sep. 18, 2012

(65) Prior Publication Data
US 2014/0081907 A1 Mar. 20, 2014

(51) Int. Cl.
*G06F 17/30* (2006.01)
(52) U.S. Cl.
CPC .. *G06F 17/30575* (2013.01); *G06F 17/30309* (2013.01)
(58) Field of Classification Search
None
See application file for complete search history.

(56) References Cited

U.S. PATENT DOCUMENTS

| | | | | |
|---|---|---|---|---|
| 5,842,196 A | * | 11/1998 | Agarwal | G06F 17/30327 |
| 7,318,066 B2 | * | 1/2008 | Kaufman et al. | |
| 8,266,122 B1 | * | 9/2012 | Newcombe et al. | 707/695 |
| 2011/0167038 A1 | * | 7/2011 | Wang et al. | 707/627 |
| 2012/0278282 A1 | * | 11/2012 | Lu | G06F 17/30575 |
| | | | | 707/634 |
| 2012/0284231 A1 | * | 11/2012 | Basescu et al. | 707/638 |
| 2013/0262401 A1 | * | 10/2013 | Bishop et al. | 707/689 |

* cited by examiner

Primary Examiner — Christopher J Raab

(57) ABSTRACT

Transient duplicate key violations of unique key constraints are handled during row updates. Row changes are buffered until a point is reached that those changes are safe to execute. Row changes are effectively reordered to avoid constraint violations during execution of updates. In response to receiving a constraint key violation from a server after an attempted update, a client locally stores a record containing information regarding the failed update. Later, in response to the lack of receipt of an error in response to another update to the same column of the same table, the client uses the information in this record to instruct the server to attempt to repeat a failed update that previously attempted to change the value of a row to a value that was present in a uniqueness-constrained column at the time of the failure, but is no longer present due to the successful update.

6 Claims, 2 Drawing Sheets

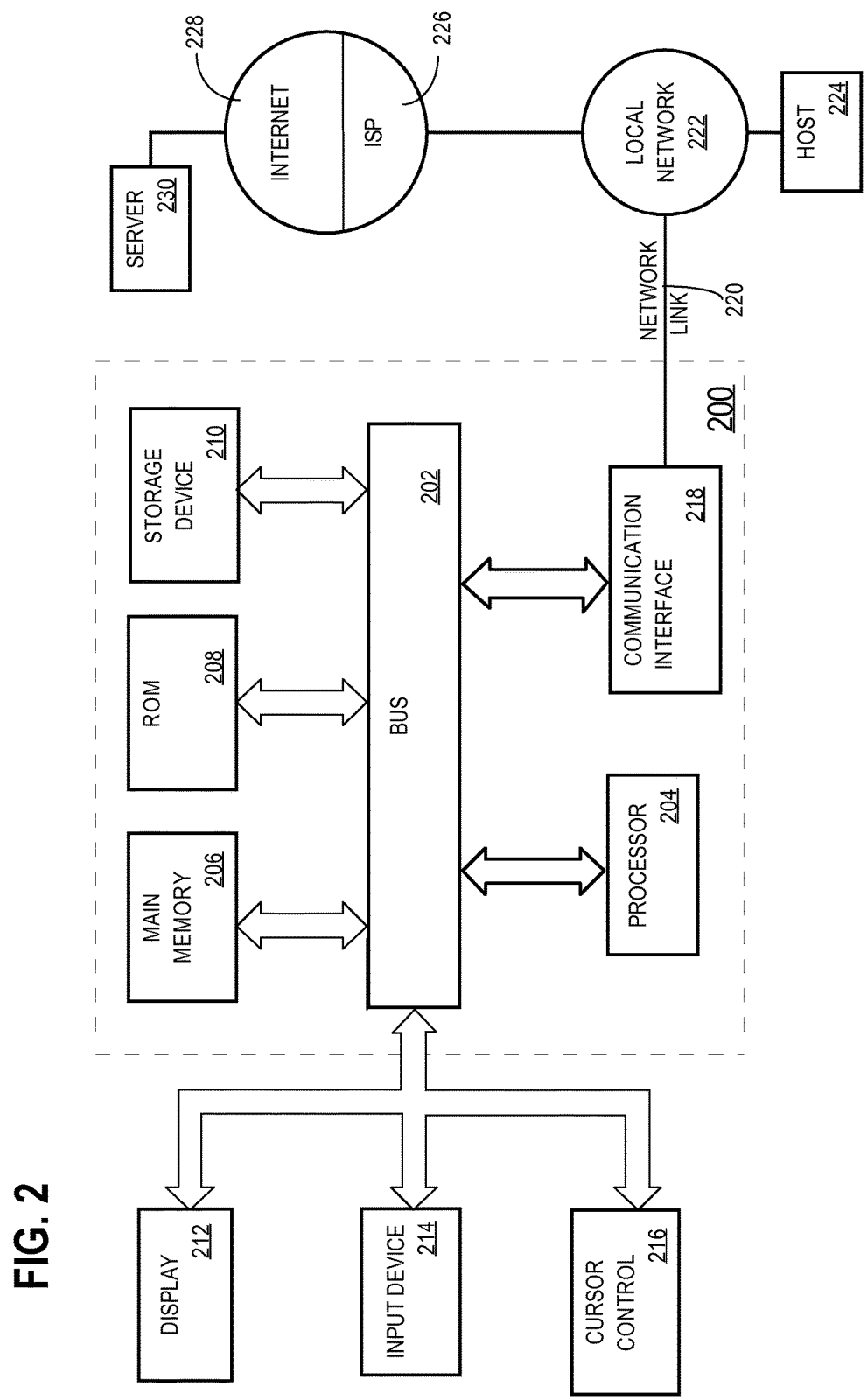

CLIENT-SIDE HANDLING OF TRANSIENT DUPLICATES FOR ROW-LEVEL REPLICATION

FIELD OF THE INVENTION

The present invention relates to replication in databases and, more specifically, to techniques for handling transient duplicate key violations of unique key constraints during row updates.

BACKGROUND

The term "database" refers to a collection of data that is multidimensional in the sense that internal links between its entries make the information accessible from a variety of perspectives. This is in contrast to a traditional file system, sometimes called a "flat file," which is a one-dimensional storage system, meaning that it presents its information from a single point of view. Whereas a flat file containing information about composers and their compositions might provide a list of compositions arranged by composer, a database might present all the works by a single composer, all the composers who wrote a particular type of music, and perhaps the composers who wrote variations of another composer's work.

Abstraction can be used to hide internal complexities. Database management systems (DBMS) hide the complexities of a database's internal structure, allowing the user of the database to imagine that the information stored in the database is arranged in a more useful format. In particular, a DBMS contains routines that translate commands stated in terms of a conceptual view of the database into the actions required by the actual storage system. This conceptual view of the database is called a "database model."

In the case of a relational database model, the conceptual view of the database is that of a collection of tables consisting of rows and columns. For example, information about a company's employees might be viewed as a table containing a row for each employee and columns labeled name, address, employee identification number, and so on. In turn, the DBMS would contain routines that allow the application software to select certain entries from a particular row of the table or perhaps to report the range of values found in the salary column—even though the information is not actually stored in rows and columns.

In a relational database model, data is portrayed as being stored in rectangular tables, called "relations," which are similar to the format in which information is displayed by spreadsheet programs. A row in a relation is called a "tuple." Tuples include information about a particular entity. Columns in a relation are referred to as "attributes" because each entry in a column describes some characteristic, or attribute, of the entity represented by the corresponding tuple.

Some DBMSs use integrity constraints to prevent invalid data entry into the base tables of the database. Integrity constraints can be defined to enforce the business rules associated with the information in a database. If any of the results of a data manipulation language (DML) statement execution violate an integrity constraint, then a DBMS may roll back the statement and return an error.

For example, an integrity constraint might be defined for the salary column of an "employees" table. This integrity constraint might enforce the rule that no row in this table can contain a numeric value greater than 10,000 in this column. If an INSERT or UPDATE statement attempts to violate this integrity constraint, then the DBMS may roll back the statement and return an information error message.

A unique key integrity constraint requires that every value in a column or set of columns (key) be unique—that is, no two rows of a table have duplicate values in a specified column or set of columns. The columns included in the definition of a unique key constraint are called the unique key. In this sense, "key" refers only to the column or set of columns used in the definition of the integrity constraint. If the unique key consists of more than one column, that group of columns is said to be a composite unique key. For example, a customer table might have a unique key constraint defined on a composite unique key including "area" and "phone" columns. Such a unique key constraint would allow the entrance of an area code and telephone number any number of times, but the combination of a given area code and given telephone number could not be duplicated in the table, preventing the unintentional duplication of a telephone number.

A problem may sometimes arise when replicating data from a source database to a target database. This problem may occur when an attempt is made to replicate update operations, which were conducted relative to the source database, relative to the target database. More specifically, this problem may occur when such an update operation affected multiple rows of a particular table. Transient duplicates may occur during an update of a table with a primary or unique key constraint. These duplicate key violations are transient in nature and are resolved by the time the update statement is completed. The transient duplicates are handled automatically during the execution of the statement on the source system. A row-level replication system captures each of the row changes individually. These row changes are applied to the target database. The execution on the target database may be unaware of the original grouping of these row changes as a single statement on the source system.

An example of a statement that may produce transient key violations is the update statement "update table T1 set k=k+1" where k is an integer column with a unique constraint. Assuming that the values in this column k are (1, 2, 3, 4), column k will contain values (2, 2, 3, 4) after the first row is updated. The double occurrence of "2" in column k is a transient key violation since, after the next row update, column k will contain values (2, 3, 3, 4). The third row update will cause the values in column k to be (2, 3, 4, 4), and the final row update will cause the values in column k to contain values (2, 3, 4, 5)—leaving no duplicate key violations in column k. Nevertheless, if the DBMS checks for constraint violations after the first row update, and does not defer constraint checking until commit time, then the DBMS may produce an error indicating that the first row update caused a unique key constraint violation.

One attempt at working around the foregoing problem involves modifying the source database schema itself to include directives that instruct the DBMS to delay the enforcement of constraints until commit time. At commit time, any transient duplicates will have been resolved, and, therefore, will not cause a violation when constraints are checked. However, some database schemas do not allow the enforcement of constraints to be delayed. If a user wanted to defer constraint enforcement under such circumstances, then for each table in the source database that had a unique key constraint, that the user could create a copy of that table lacking the constraints in the source database and then perform source-to-target replication on the table copies rather than the originals. In another approach, the user could remove the constraint on the table at the target database.

These approaches are unduly complex, wasteful of time, and/or storage space. Furthermore, this approach sometimes cannot be taken if applications, which use the database, expect to refer to data structures having certain properties.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 is a block diagram illustrating an example of a computer on which an embodiment of the invention may be implemented.

DETAILED DESCRIPTION

Figure 1:
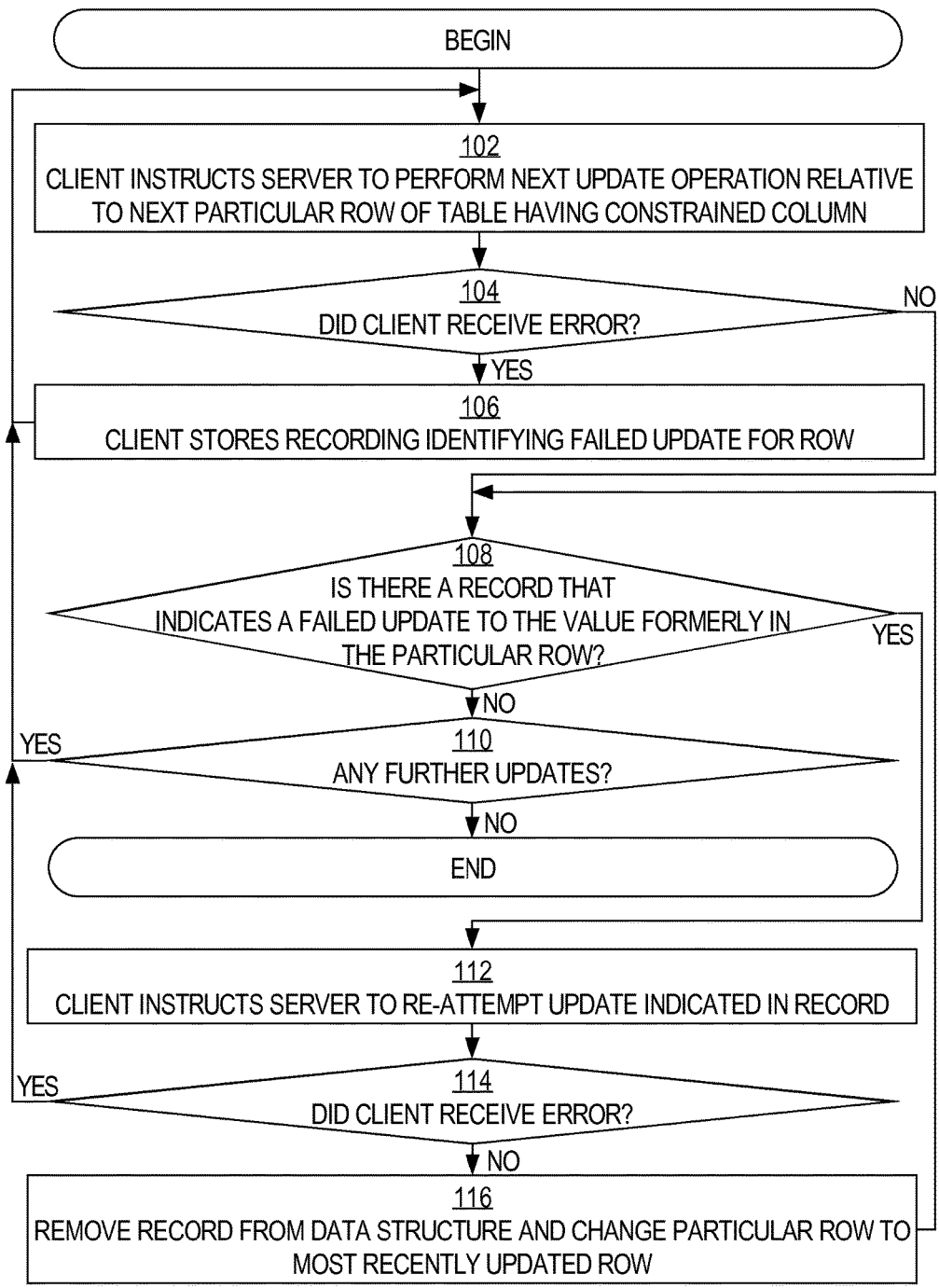
FIG. 1 is a flow chart illustrating a client-side technique for handling transient duplicate constraint violations, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques described herein handle transient duplicate key violations of unique key constraints during row updates. Row changes are buffered until a point is reached that those changes are safe to execute. One technique effectively reorders the row changes to avoid constraint violations during execution of updates. In response to receiving a constraint key violation from a server after an attempted update, a client locally stores a record containing information regarding the failed update. Later, in response to the lack of receipt of an error in response to another update to the same column of the same table, the client uses the information in this record to instruct the server to attempt to repeat a failed update that previously attempted to change the value of a row to a value that was present in a uniqueness-constrained column at the time of the failure, but is no longer present due to the successful update.

Techniques described herein include a server-side technique and a client-side technique. Both techniques are described in turn.

Server-Side Technique

According to one embodiment of the invention, a solution is implemented within the database server that performs the update operations on the target database. As duplicates occur during a table update, the database server tracks these duplicates in a workspace (which in one embodiment of the invention is maintained in volatile memory). The workspace contains data structures, such as hash tables, for tracking the duplicates. The database server defers unique key constraint checking during the actual update process. The database server uses the data structures in the workspace to determine, at commit time, whether any of the tracked duplicates was non-transient in nature and therefore a violation of a unique key constraint.

Each time that a performance of an update operation is requested relative to a table, the database server determines whether that update operation would cause a unique key constraint to be violated. If the database server determines that the update operation would cause such a violation, then, instead of actually performing the update relative to the table, the database server creates an entry in the workspace that indicates (a) the row identifier of the row on which the update was going to be performed and (b) the values that the constrained column was going to contain before and after the update of that row. The entry may be created in a data structure specifically for the table and constrained column affected by the requested update. Thus, the actual update of the table itself is delayed.

Additionally, each time that a performance of an update operation is requested relative to a table that contains a constrained column, the database server determines whether any existing entry in the workspace (in a data structure specifically for that table and constraint column) indicates a post-update value that is the same as the pre-update value of the update operation whose performance is being requested. For such each existing entry in the workspace, the database server performs the update indicated by that existing entry relative to the table (since the update being requested eliminates the possibility of a constraint violation due to performance of the update indicated in that existing entry), and removes that existing entry from the workspace.

For example, if an existing entry in the workspace indicates that a constrained column value in the first row of a particular table was supposed to be changed from 1 to 2, and if the update operation being requested will change the value of a second row for that constrained column from 2 to 3, then the database server proceeds to perform the update of the first row and removes the entry indicating the change from 1 to 2. The database server still delays the performance of the update of the second row and creates a new entry in the workspace for that update. In one embodiment of the invention, the data structures in the workspace are hash tables for whose entries the hash keys are based on the post-update values of the updates whose requests caused those entries to be created in the workspace. This scheme permits the rapid detection of relevant entries in the data structure.

At commit time, the database server determines whether any entries remain in the workspace for a particular table. If at least one entry remains in the workspace for a particular table, then the database server indicates that a non-transient duplicate has caused a constraint violation relative to the particular table. Thus, constraints remain in force. Under circumstances where updates are being replicated from a source database to a target database, such non-transient duplicate constraint violations typically will occur, because they would not have been present in the source database prior to the replication; constraints would have been previously enforced against the source database, and so the source database would not have contained any non-transient duplicate constraint violations.

An update to a table may also cause an update to an index on that table. Typically, a constraint violation occurs relative to such an index rather than the table itself. Therefore, in one embodiment of the invention, in response to determining that an update being requested will cause a constraint violation relative to a table, the database server permits the update to be performed relative to the table itself, but delays the update of the index on that table, instead creating an entry for the index update in the workspace for the index. By buffering updates only for the index on the table rather than for the table itself, some savings in storage may be obtained. Such an approach in possible in a server-side implementation because the database server may expose, to applications, application programming interfaces that permit applications to specify special handling of index updates separate from table updates. In one embodiment of the invention, through such interfaces, a client application instructs a database server to create a workspace for a particular table and to handle constraint checking for updates relative to the particular table and/or its indices in the special manner described above.

In one embodiment of the invention, the workspace used for replication operations in the manner described above is the same workspace that the database server already uses for updates not involving replication; techniques may take advantage of the possibility that the database server already maintains such a workspace for other purposes.

In one embodiment of the invention, the check for non-transient duplicate constraint violations is performed earlier than commit time. For example, in one embodiment of the invention, the check for entries remaining in the workspace is performed as soon as a transaction begins to request an update operation relative to a table other than the table for which entries were being added to the workspace. For another example, in one embodiment of the invention, the check for entries remaining in the workspace is performed as soon as a transaction begins to perform a type of operation other than an update operation that caused entries to be added to a workspace.

Client-Side Technique

Under some circumstances, a client application might need to interface with a database server that is not designed to perform the server-side technique described above. Under such circumstances, the burden of avoiding transient duplicate constraint violations falls upon the client. Typically, a client interfacing with a generic database server (i.e., a database server that does not implement the server-side techniques discussed above) does not have the luxury of causing that database server to handle table updates in a manner differently from the manner in which the database server handles index updates. Consequently, a client-side technique tracks all updates to tables in the client's workspace rather than just updates to indices on those tables. The client defers the entire update operation to the table. Client-side techniques described herein can be used even relative to databases in which table indices do not specifically permit constraints to be deferred.

In one embodiment of the invention, the client receives an error from the database server in response to the database server's detection of a constraint violation relative to a table on which the client has instructed the server to perform an update operation. The error might or might not be due to a merely transient duplicate. The client takes on the responsibility of determining whether the error was caused by a merely transient duplicate. In such an embodiment of the invention, the client maintains its own client-side workspace (e.g., in the volatile memory allocated to the client), similar in structure and function to the workspace described above in connection with the server-side technique.

Therefore, in one embodiment of the invention, in response to receiving such an error, the client adds an entry in its workspace for the particular table and row in which the error occurred. The receipt of the error indicates to the client that the update of that row did not occur in the database at the server side. As with the server-side technique, the entry indicates the pre-update and post-update values that would have been involved in the update had an error not occurred; these values are known to the client prior to the receipt of the error. The client then proceeds to instruct the database server to attempt to perform the next operation (usually relative to a different row) specified by the update being performed relative to the particular table. Thus, the client buffers the failed operation and continues. As will be seen below, the client will seek an opportunity to attempt the buffered operation again at a later time.

Whenever the client instructs the server to perform an update to a particular row of the particular table and does not receive such an error in response, the absence of the error indicates to the client that the update was successful relative to the particular row. This also indicates to the client that the constrained column in the particular table does not, after the successful update operation, contain the pre-update value of the particular row that was updated by the successful update operation. For example, if the successful update operation updated the value of a constrained column from 3 to 4, then the client becomes aware that the constrained column does not at that time contain the value 3. This awareness provides an opportunity for the client to attempt to re-perform previously failed updates for which the post-update value indicated in the workspace is 3.

In response to determining that an update to a particular row of a particular table was successful (due to no error being returned by the server), the client attempts to locate, in its workspace for that particular table, an entry that indicates a post-update value that is equal to the pre-update value that was successfully updated in the particular row. If the client locates such an entry in the client's workspace for the particular table, then the client repeats, to the database server, its previously failed instruction to perform the update specified by that entry. If the server does not return an error in response to this repeated instruction, this means that the repeated update instruction successfully caused the particular table to be updated, and so the client responsively removes, from its workspace for the particular table, the entry that corresponds to the repeated update instruction. That successful update then causes the client to perform the technique described above relative to another entry in the workspace for the particular table, in a potentially cascading manner. If the source database did not contain any constraint violations, then, by commit time, the client's workspace will be empty of all entries caused by transient duplicate constraint violations.

FIG. 1 is a flow chart illustrating a client-side technique for handling transient duplicate constraint violations, according to an embodiment of the invention. The example technique begins in block 102. In block 102, a client instructs a server to perform a next update operation relative to a particular row of a table that has a uniqueness-constrained column. In block 104, the client determines whether the client has received, from the server, an error that indicates that the update operation failed because the operation would have updated a value of the uniqueness-constrained column to a destination value that the column already contained. If the client has received such an error, then control passes to block 106. Otherwise, control passes to block 108.

In block 106, in response to the receipt of the error, the client stores, in a data structure maintained in memory allocated to the client, a record that identifies the particular row, the current value(s) in the column(s) that the failed update operation targeted, and the destination value(s) that the failed update operation would have placed in those column(s). Control then passes back to block 102, in which the client attempts to perform the next update operation after the failed update operation.

Alternatively, in block 108, the client determines whether the data structure contains a record that indicates a previously failed update that would have updated (a) a value in the uniqueness-constrained column and another row to (b) the value that was contained in that column and the particular row prior to the most recent successful update operation. For example, if the most recent successful update operation changed the value in the constrained column from a 3 to a 4, then the client attempt to locate a record that indicates a previously failed update that would have changed another value in the constrained column to a 3. If the data structure contains such a record, then control passes to block 112. Otherwise, control passes to block 110.

In block 110, the client determines whether any other update operations remain to be performed relative to the table. If another update operation remains to be performed relative to the table, then control passes back to block 102, in which the client attempts to perform the next update operation after the successful update operation. Otherwise, the technique illustrated in FIG. 1 is finished.

Alternatively, in block 112, the client instructs the server to attempt to perform the previously failed update identified in the record that the client located in block 108. In block 114, the client determines whether the client has received, from the server, an error that indicates that the update operation failed because the operation would have updated a value of the uniqueness-constrained column to a destination value that the column already contained. If the client has received such an error, then control passes back to block 102, in which the client attempts to perform the next update operation after the successful update operation. Otherwise, control passes to block 116.

In block 116, the client removes, from the data structure, the record that identifies the update operation that the client located in block 108. For purposes of the description in the flow diagram, the row that the successful update operation changed now becomes the particular row. Control passes back to block 108, in which the client attempts to locate yet another record in the data structure in light of the recent successful repeated update operation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   instructing a server to perform a first update operation to change a uniqueness-constrained column of a first row in a table to a first value;
   receiving a constraint violation error from the server indicating the first update operation cannot be performed because said uniqueness-constrained column already contains the first value, said first value being contained in said uniqueness-constrained column in a second row;
   in response to receiving the constraint violation error from the server, adding said first value to a data structure;
   instructing said server to perform a second update operation that changes said uniqueness-constrained column of said second row from said first value to a second value,
   in response to determining that said server has performed, without returning an error, said second update operation, determining that said data structure contains said first value;
   in response to determining that said data structure contains said first value, instructing the server to perform a third update operation that changes said uniqueness-constrained column of said first row to said first value;
   wherein before said change to said uniqueness-constrained column of said first row said uniqueness-constrained column of said first row contains a previous value;
   in response to determining that the server has performed the third update operation, determining that said data structure contains said previous value;
   in response to determining that said data structure contains said previous value, instructing the server to perform another update operation to said uniqueness-constrained column of another row to said previous value; and
   wherein the method is performed by one or more computing devices.

2. The method of claim 1, further comprising:
   in response to determining that said data structure contains said first value, removing said first value from a first record in said data structure.

3. The method of claim 1, wherein determining that said data structure contains said first value comprises locating a record in said data structure that has a hash key that was generated based on the first value.

4. A non-transitory computer-readable medium storing instructions which, when executed by one or more processors, cause:
   instructing a server to perform a first update operation to change a uniqueness-constrained column of a first row in a table to a first value;
   receiving a constraint violation error from the server indicating the first update operation cannot be performed because said uniqueness-constrained column already contains the first value, said first value being contained in said uniqueness-constrained column in a second row;

in response to receiving the constraint violation error from the server, adding said first value to a data structure;

instructing said server to perform a second update operation that changes said uniqueness-constrained column of said second row from said first value to a second value, in response to determining that said server has performed, without returning an error, said second update operation, determining that said data structure contains said first value;

in response to determining that said data structure contains said first value, instructing the server to perform a third update operation that changes said uniqueness-constrained column of said first row to said first value;

wherein before said change to said uniqueness-constrained column of said first row said uniqueness-constrained column of said first row contains a previous value;

in response to determining that the server has performed the third update operation determining that said data structure contains said previous value; and in response to determining that said data structure contains said previous value, instructing the server to perform another update operation to said uniqueness-constrained column of another row to said previous value.

5. The non-transitory computer-readable medium of claim 4, wherein the instructions further include instructions that, when executed by one or more processors, cause:

in response to determining that said data structure contains said first value, removing said first value from a first record in said data structure.

6. The non-transitory computer-readable medium of claim 4, wherein determining that said data structure contains said first value comprises locating a record in said data structure that has a hash key that was generated based on the first value.

* * * * *

UNITED STATES PATENT AND TRADEMARK OFFICE
CERTIFICATE OF CORRECTION

PATENT NO. : 9,965,535 B2
APPLICATION NO. : 13/622276
DATED : May 8, 2018
INVENTOR(S) : Tran et al.

Page 1 of 1

It is certified that error appears in the above-identified patent and that said Letters Patent is hereby corrected as shown below:

In the Claims

In Column 12, Line 2, in Claim 4, delete "operation" and insert -- operation, --, therefor.

Signed and Sealed this
Thirteenth Day of November, 2018

Andrei Iancu
*Director of the United States Patent and Trademark Office*